(12) United States Patent
Yim et al.

(10) Patent No.: US 12,463,839 B2
(45) Date of Patent: Nov. 4, 2025

(54) APPARATUS AND METHOD FOR ELECTING COMMITTEE NODE IN BLOCKCHAIN

(71) Applicant: ELECTRONICS AND TELECOMMUNICATIONS RESEARCH INSTITUTE, Daejeon (KR)

(72) Inventors: Jong-Choul Yim, Daejeon (KR); Jin-Tae Oh, Daejeon (KR); Young-Chang Kim, Daejeon (KR); Chang-Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 243 days.

(21) Appl. No.: 18/454,584

(22) Filed: Aug. 23, 2023

(65) Prior Publication Data

US 2024/0121122 A1     Apr. 11, 2024

(30) Foreign Application Priority Data

Oct. 11, 2022   (KR) .................. 10-2022-0129943
May 9, 2023    (KR) .................. 10-2023-0059683

(51) Int. Cl.
*H04L 9/30*     (2006.01)
*H04L 9/00*     (2022.01)

(52) U.S. Cl.
CPC . *H04L 9/50* (2022.05); *H04L 9/30* (2013.01)

(58) Field of Classification Search
CPC .................................. H04L 9/50; H04L 9/30
See application file for complete search history.

(56) References Cited

U.S. PATENT DOCUMENTS 11,343,073 B2   5/2022   Oh et al.
11,388,017 B2   7/2022   Xie et al.
(Continued)

FOREIGN PATENT DOCUMENTS

CN          111131181 A      5/2020
KR    10-2020-0121141 A     10/2020
(Continued)

OTHER PUBLICATIONS

Taotao Wang et al., "Ethna: Analyzing the Underlying Peer-to-Peer Network of Ethereum Blockchain", IEEE Transactions on Network Science and Engineering, arXiv:2010.01373v2, 2021.
(Continued)

*Primary Examiner* — Normin Abedin

(57) ABSTRACT

Disclosed are an apparatus and method for electing a committee node in a blockchain. The apparatus for electing a committee node in a blockchain is configured to transmit a staking transaction including validator information to a blockchain system to register a validator node, generate a draw pool for electing a committee node based on the validator information, change entries of the draw pool using a predefined shuffling algorithm, select a preset number of top entries as votes of a committee member from among the entries of the shuffled draw pool, and elect, as the committee node, the validator node that has acquired votes of a committee.

18 Claims, 10 Drawing Sheets

RN: REPLICATION NODE
VN: VALIDATOR NODE
CN: COMMITTEE NODE

(56) References Cited

U.S. PATENT DOCUMENTS

| | | |
|---|---|---|
| 2021/0021419 A1 | 1/2021 | Guo et al. |
| 2021/0097537 A1 | 4/2021 | Guo et al. |
| 2021/0297239 A1 | 9/2021 | Oh et al. |
| 2022/0122062 A1* | 4/2022 | Mayblum ............ G06Q 20/381 |
| 2022/0150169 A1 | 5/2022 | Thai et al. |
| 2022/0385460 A1 | 12/2022 | Guo et al. |
| 2023/0023060 A1* | 1/2023 | Davies ................ G07F 17/3276 |
| 2023/0169062 A1* | 6/2023 | Htay ................... G06F 16/2365 |
| | | 705/44 |

FOREIGN PATENT DOCUMENTS

| | | |
|---|---|---|
| KR | 10-2020-0132149 A | 11/2020 |
| KR | 10-2020-0140897 A | 12/2020 |
| KR | 10-2022-0001576 A | 1/2022 |
| KR | 10-2406020 B1 | 6/2022 |
| WO | 2022/010004 A1 | 1/2022 |

OTHER PUBLICATIONS

"Vitalik's Annotated Ethereum 2.0 Spec", HackMD, Jul.-Aug. 2020, web page: https://notes.ethereum.org/@vbuterin/SkeyEl3xv.

* cited by examiner

RN: REPLICATION NODE
VN: VALIDATOR NODE
CN: COMMITTEE NODE

APPARATUS AND METHOD FOR ELECTING COMMITTEE NODE IN BLOCKCHAIN

CROSS REFERENCE TO RELATED APPLICATIONS

This application claims the benefit of Korean Patent Application Nos. 10-2022-0129943, filed Oct. 11, 2022 and 10-2023-0059683, filed May 9, 2023, which are hereby incorporated by reference in their entireties into this application.

BACKGROUND OF THE INVENTION

1. Technical Field

The present disclosure relates generally to a blockchain technology, and more particularly to a technology for electing a committee node in a blockchain.

2. Description of the Related Art

For a decentralized blockchain system, when a node intends to participate in the system, there is not any limitation or requirement for permission, which results in a Sybil attack in a block generation process. For preventing this, a proof of work (PoW) method or a proof of stake (PoS) method is mainly used in a decentralized blockchain system.

The PoW method is a method for a node, which solves a cryptographic hash problem of a very high level of difficulty, to acquire the block generation qualification, and the PoS is a method for imparting a qualification for block generation to a user (or a node) having a more stake with a higher probability.

The PoS blockchain system randomly elects some of overall validator nodes, which constitute the system, to constitute a block generation committee. The block generation committee reelects nodes for each specific cycle (e.g., 1 block, 100 blocks, etc.).

The block generation committee uses a suitable Byzantine tolerance consensus protocol (i.e., practical Byzantine fault tolerant (PBFT)) to consent and generate blocks.

Here, under assumption that there may be Byzantine nodes, in order for some, not the overall, nodes (the block generation committee nodes) to safely consent and generate blocks, the block generation committee constituted of hundreds of nodes may be required.

The number of the overall nodes constituting a blockchain system may be thousands to hundreds of thousands. Such a system constituted of large-scaled nodes is connected over a p2p network. Here, in order to transfer a message from one node to another node, several p2p network hops may be required. For example, for Ethereum, transferring a message from one node to another node takes on average 3.7 hops or maximum 6 hops.

In such an environment, when hundreds of nodes randomly selected for each specific cycle use a consensus protocol to generate blocks, it may take a very long time to reach block consensus. This finally causes a low transaction processing speed and lowers the utility of the blockchain system.

The time to reach the block consensus depends on the number and network topology of the nodes constituting the committee. When nodes are randomly selected to constitute the committee in a blockchain system having large scale nodes, the network topology of the committee nodes in terms of the number of hops is not so different from that of the entire network. After all, the number of nodes constituting the committee is large and the average number of network hops between the nodes is large, and thus a time to reach block consensus becomes longer.

Accordingly, in order to improve a transaction processing performance of the PoS blockchain system, a technology is required which reduces the number of nodes of the committee without damaging the safety of the consensus protocol and efficiently constitutes the network topology of the committee in terms of network hops.

Meanwhile, Korean Patent No. 10-2406020, entitled "Decentralized Byzantine fault tolerance distribution consensus apparatus and method" disclosed a technology for optimizing Byzantine fault tolerance (BFT) distribution consensus protocol and messages of decentralized nodes.

SUMMARY OF THE INVENTION

Accordingly, the present disclosure has been made keeping in mind the above problems occurring in the prior art, and an object of the present disclosure is to provide a blockchain technology which reduces a consensus delay time of a block generation committee.

Another object of the present disclosure is to provide a blockchain technology which reduces a network delay between nodes that participate in a consensus protocol.

In accordance with an aspect of the present disclosure to accomplish the above objects, there is provided an apparatus for electing a committee node in a blockchain, including one or more processors, and memory configured to store at least one program that is executed by the one or more processors, wherein the at least one program is configured to transmit a staking transaction including validator information to a blockchain system to register a validator node, generate a draw pool for electing a committee node based on the validator information, change entries of the draw pool using a predefined shuffling algorithm, select a preset number of top entries as votes of a committee member from among the entries of the shuffled draw pool, and elect, as the committee node, the validator node that has acquired votes of a committee.

The at least one program may be configured to generate the draw pool by reading a validator public key and balance from the validator information, and by adding draw pool entries to the draw pool in proportion to a number of votes of the validator.

The draw pool may include entries having the validator public key corresponding to a draw index.

The at least one program may be configured to randomly change the validator public key corresponding to the draw index among the entries of the draw pool to a validator public key of an additional draw pool using the predefined shuffling algorithm.

The committee node may cast a number of votes identical to a number of votes of a committee member in order to generate blocks in a block generation process.

Each validator node may have a weight proportional to voting power thereof, and a validator node which has heavier weight than a preset weight may become a prioritized validator, wherein the prioritized validator may establish priority connection with other prioritized validators.

The prioritized validator node may forcibly terminate normal connection with a previously connected node which is not a prioritized validator node in order to perform the priority connection.

The priority connection may be managed as a priority connection class by nodes of the blockchain system.

The nodes of the blockchain system may establish the priority connection with other nodes based on a current number of established connections corresponding to each priority connection class.

In accordance with another aspect of the present disclosure to accomplish the above objects, there is provided a method for electing a committee node in a blockchain, the method being performed by an apparatus for electing a committee node in a blockchain, the method including transmitting a staking transaction including validator information to a blockchain system to register a validator node, generating a draw pool for electing a committee node based on the validator information, changing entries of the draw pool using a predefined shuffling algorithm, selecting a preset number of top entries as votes of a committee member from among the entries of the shuffled draw pool, and electing, as the committee node, the validator node that has acquired votes of a committee.

Generating the draw pool may include generating the draw pool by reading a validator public key and balance from the validator information, and by adding draw pool entries to the draw pool in proportion to a number of votes of the validator The draw pool may include entries having the validator public key corresponding to a draw index.

Changing the entries of the draw pool may include randomly changing the validator public key corresponding to the draw index among the entries of the draw pool to a validator public key of an additional draw pool using the predefined shuffling algorithm.

The committee node may cast a number of votes identical to a number of votes of a committee member in order to generate blocks in a block generation process.

Each validator node may have a weight proportional to voting power thereof, and a validator node which has heavier weight than a preset weight may become a prioritized validator, wherein the prioritized validator may establish priority connection with other prioritized validators.

The prioritized validator node may forcibly terminate normal connection with a previously connected node which is not a prioritized validator node in order to perform the priority connection.

The priority connection may be managed as a priority connection class by nodes of the blockchain system.

The nodes of the blockchain system may establish the priority connection with other nodes based on a current number of established connections corresponding to each priority connection class.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
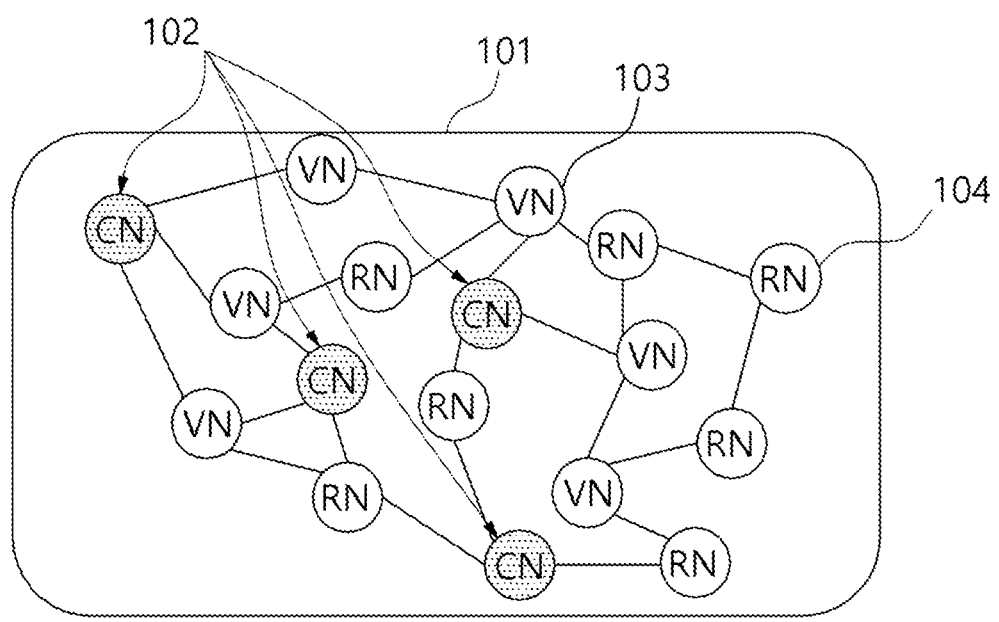
FIG. 1 is a diagram illustrating a distribution transaction processing system constituted of large scale nodes which perform committee-based consensus according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the accompanying drawings.

FIG. 1 is a diagram illustrating a distribution transaction processing system constituted of large scale nodes which perform committee-based consensus according to an embodiment of the present disclosure.

The distribution transaction processing system 101 may include a plurality of nodes.

The nodes may be directly connected over one network hop and may be connected through a p2p network as the number of nodes increases.

Each node may have a state machine and process transactions to update the state machine of its own.

The transaction is configured with a single transaction or includes the disposition of transactions such as a transaction set or blocks in a blockchain.

Nodes may be divided into committee nodes (CN) 102, validator nodes (VN) 103, or replication nodes (RN) 104 according to their roles.

Each of the committee nodes 102 may use a Byzantine tolerance consensus protocol such as practical Byzantine fault tolerant (PBFT) to generate blocks.

Each of the validator nodes 103 is a node having a qualification for directly participating in a block generation process and may be a committee node for a specific block by random selection.

Each of the replication nodes 104 may receive a block for which consensus is reached to update its own state machine and transmit the block and a transaction to an adjacent node.

Here, each of the committee nodes 102 may be randomly selected from among the validation nodes 103 according to a preset specific cycle (e.g., one block).

Figure 2:
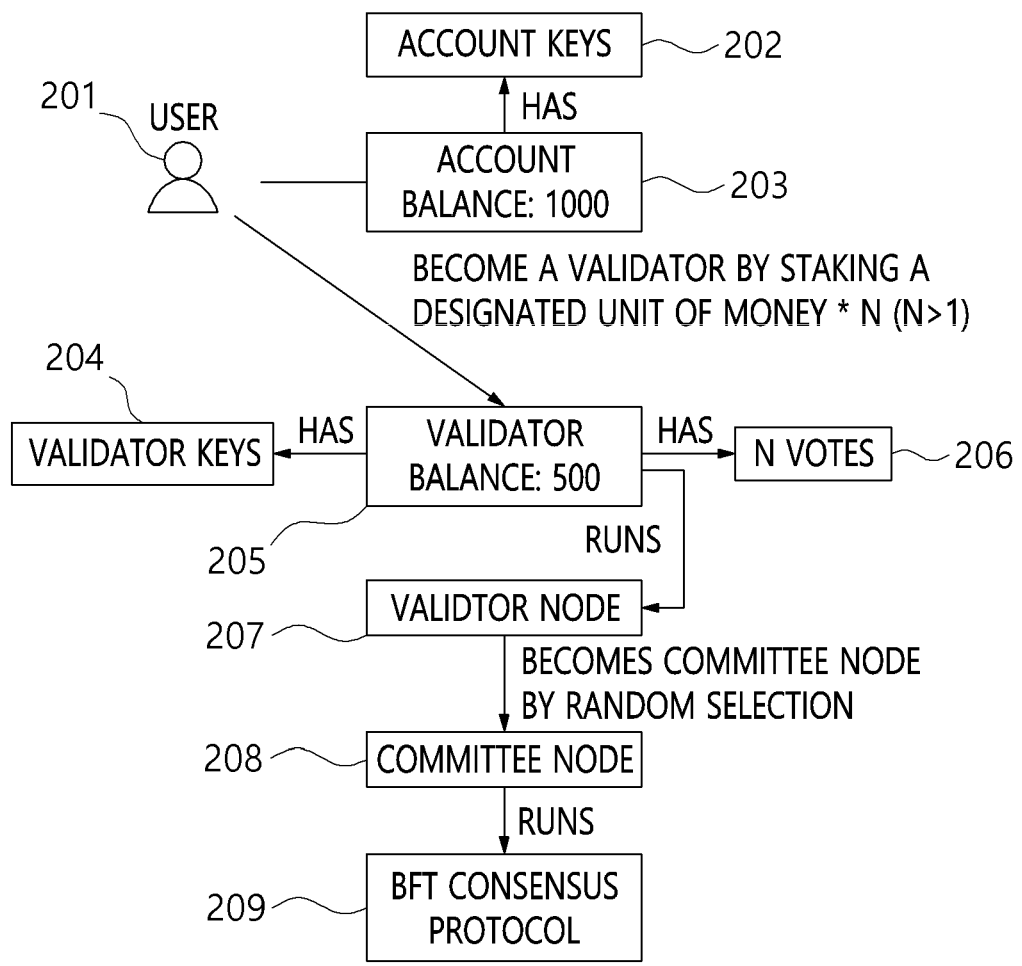
FIG. 2 is a diagram illustrating a blockchain system of a proof of stake (PoS) method according to an embodiment of the present disclosure.

FIG. 2 is a diagram illustrating a proof-of-stake (PoS) blockchain system according to an embodiment of the present disclosure.

Referring to FIG. 2, an apparatus for electing a committee node in a blockchain according to an embodiment of the present disclosure may correspond to nodes included in the PoS blockchain system.

A user 201 may have an account 203 for using the PoS blockchain system.

The account 203 may be managed by account keys 202 made by a public key scheme.

The account keys 202 includes a pair of public key and secret key, and ECDSA, EC-Schnorr, BLS or the like may be used as the public key scheme.

The account 203 may include account balance information.

The user 201 may be a validator 205 by staking a portion or the entirety of balance of its own account 203.

When the staking by the user 201 is successful, the balance may be reduced by the staked amount, and the validator 205 may have the balance as much as the staked amount.

The validator 205 may have N votes 206 in proportion to an amount of its own balance.

The number of votes of the validator 205 may be computed by Floor (balance/Staking_Unit of the validator). Here, Floor ( ) means discarding decimals. Staking_Unit means a unit of money at the time of staking, a value of which being able to be defined as a system parameter.

For example, when Staking_Unit is 50 and the user 201 stakes 510, the validator may have 10 votes.

The validator 205 may operate a validator node 207. Here, the validator 205 may set validator keys 204 so that the validator node 207 may access.

For example, the validator keys may be stored in a specific directory of a server in which the validator node 207 is run.

Through this, the validator node 207 may represent a specific validator.

Blocks may be generated in such a way that the blocks are proposed by a block generation committee and the proposed blocks are consented. Here, a BFT protocol such as the PBFT protocol may be used as a consensus protocol.

The block generation committee may be composed of the validator 205 elected through a predefined random selection method that is run in proportion to the number of votes 206 of the validator.

Through the random selection method, it may be determined whether the votes of the validator are selected as votes of the committee.

Here, when the validator has one or more votes of the committee, the validator 205 may be elected as a member of the block generation committee.

The total number of votes 206 of the block generation committee may be determined by the value of Committee_Size defined as a system parameter.

When the validator node 207 is elected to serve as a committee member, the validator node 207 may become a committee node 208, and the committee node 208 may participate in the block generation process.

Figure 3:
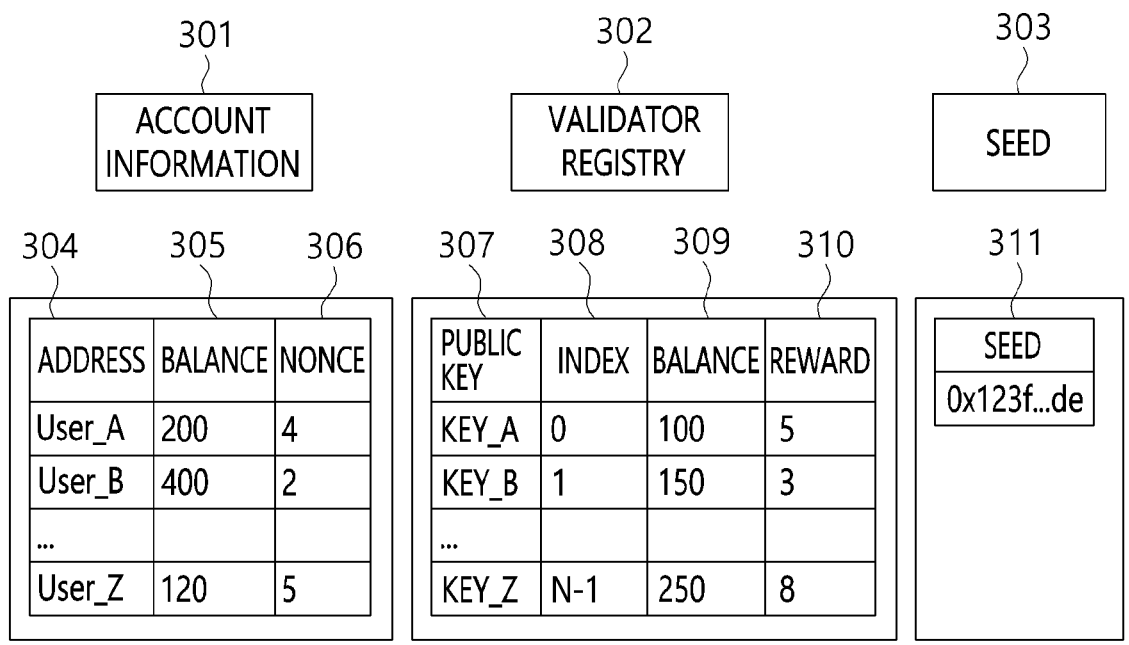
FIG. 3 is a diagram illustrating a state model of a blockchain system according to an embodiment of the present disclosure.

FIG. 3 is a diagram illustrating a state model of the blockchain system according to an embodiment of the present disclosure.

Referring to FIG. 3, it may be noted that when all the nodes treat the same block, the nodes may have the same state. The state of the blockchain may include Account Information 301, a Validator Registry 302 and a Seed 303.

In the Account Information 301, account information about a user may be stored.

Here, the Account Information 301 may store the value of a Balance 305 and the value of a Nonce 306 of the account identified by an account address 304.

Here, in the Account Information 301, additional other variable values may also be stored.

Here, the value of a Nonce 306 is a value used when a transaction is generated from the corresponding account, and may increase by 1 whenever the transaction is successfully treated.

The Validator Registry 302 may store information about the validator including the value of a Public Key 307, the value of an Index 308, a Balance 309, or the value of a Reward 310 of the validator.

The Public Key 307 of the validator may be a public key between a pair of keys (a public key, a private key) according to a public key scheme of the validator, and may be used when an electronic signature of the transaction or a consensus protocol message of the validator is verified.

The value of an Index 308 is a sequence number granted to the registered validator.

Here, the value of an Index 308 may increase by 1 whenever a new Validator is added.

If the Validator loses the qualification for a certain reason, the corresponding value of the Index 308 becomes an unallocated index, and the value of the unallocated index value may be granted when a new Validator is added later.

The Balance 309 is an amount staked by the user in order to obtain a corresponding validator qualification.

The value of a Reward 310 is the total amount of rewards to be obtained by the validator when the validator obtains the qualification of the committee to participate in the block generation.

A Seed 303 has a seed value of a random function used when a committee member is elected among the validators.

The random function may generate a deterministic random number according to a seed. In other words, when seed values applied to the random function are equal, the result may always be the same.

For a state of the blockchain node, a state in which up to an N-th block are treated may be called as state N, and state N may be defined as the current values of the Account Information 301, the Validator Registry 302, and the Seed 303 generated as a result of treating up to block N.

Figure 4:
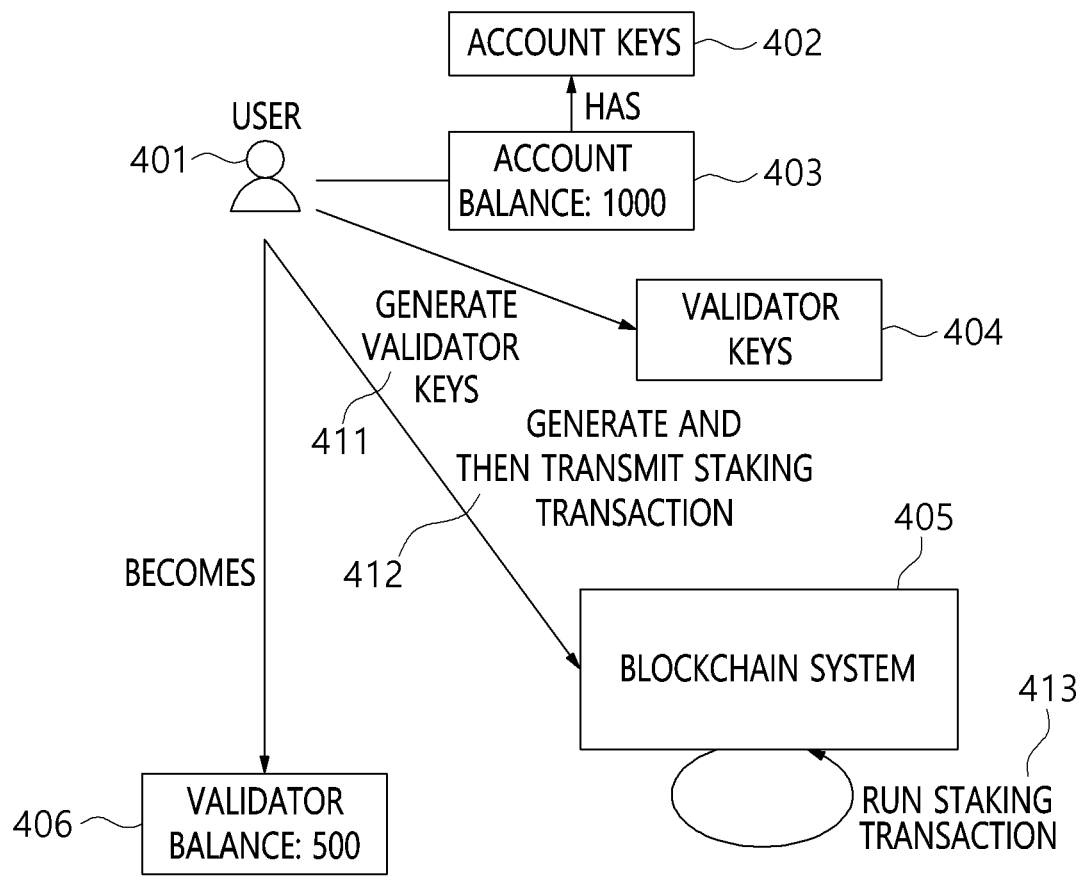
FIG. 4 is a diagram illustrating a staking process according to an embodiment of the present disclosure.

FIG. 4 is a diagram illustrating a staking process according to an embodiment of the present disclosure.

Referring to FIG. 4, it is assumed that a user 401 desired to be a validator 406 has its own account 403 stored in a blockchain system.

The user 401 may perform a staking process for determining a validator in a PoS blockchain system through a blockchain committee election apparatus.

First, the blockchain committee election apparatus may generate 411 validator keys 404 composed of a private key and a public key.

The blockchain committee election apparatus may make a stake transaction referred to as RegisterValidator to transmit 412 the state transaction to the blockchain system.

The RegisterValidator transaction may include a value of the public value between the pair of keys 404 of the validator, an address value of the user account, an amount to be staked, and a nonce value of the transaction.

The transaction may be electronically signed using the private key between a pair of Account keys 402 of the user.

If the RegisterValidator transaction is valid, the RegisterValidator transaction may be included in a block to be run in the blockchain system.

Here, the condition that the transaction is valid may be defined as that the balance of an account is larger than the staking amount, the staking amount is at least Staking_Unit or higher, and the electronic signature is correct.

When the Staking transaction is included in the block to be normally run 413 in the blockchain system, the validator information may be recorded in a blockchain state, and the user may be registered as a validator.

Here, the blockchain state may be changed so that the account balance of the user is reduced by the staked amount, and the corresponding Validator is added to the Validator Registry.

Here, the public key value and the amount to be staked included in the RegisterValidator transaction may be stored as the values of the Public key and Balance in the Validator Registry. 0 may be stored in the Reward. A smallest value among the values of the Index, which are not used currently, may be allocated to the Index value as the value of the Index. When all the values of the Index are used, the current value +1 of the Index may be used.

Figure 5:
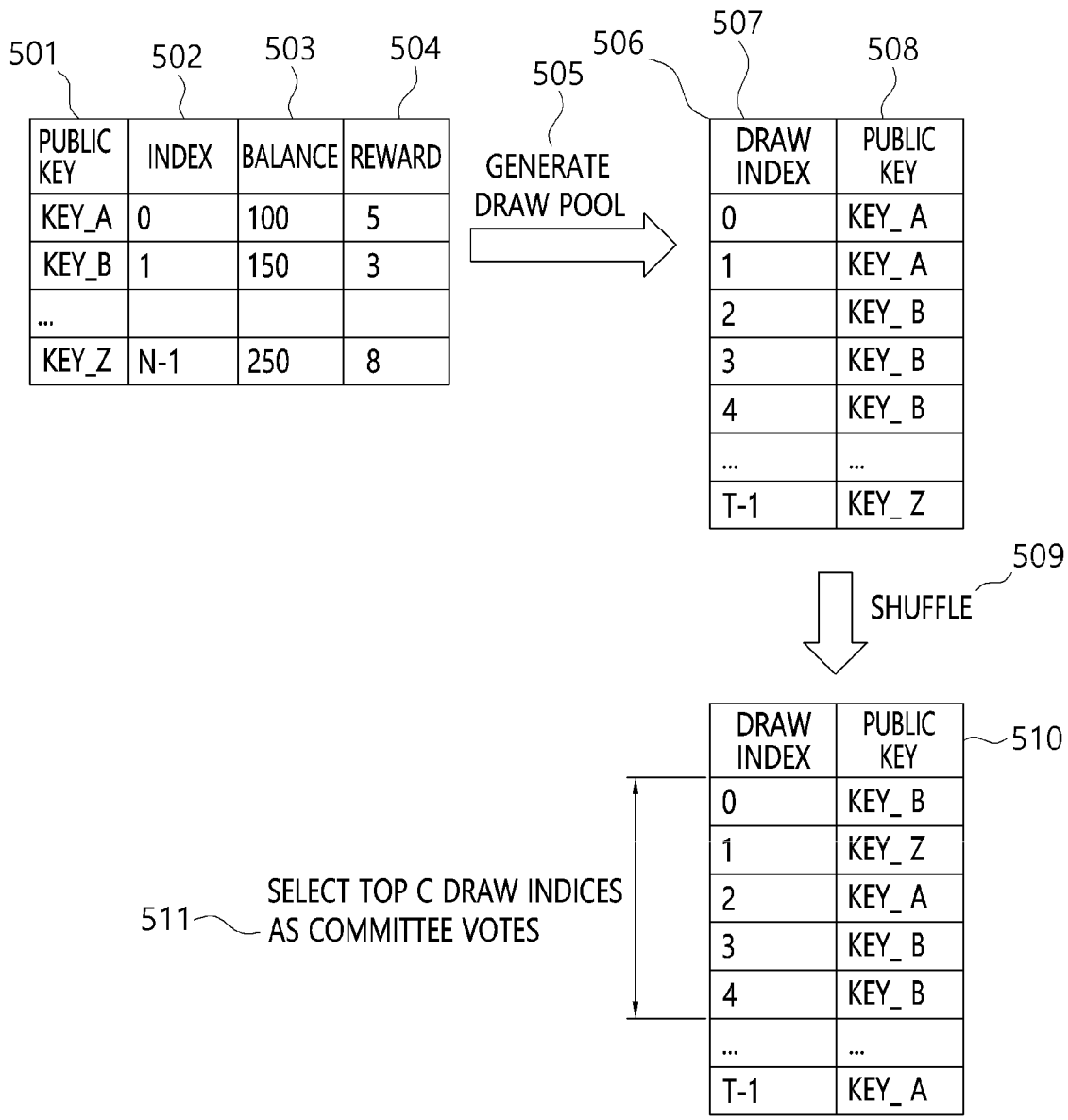
FIG. 5 is a diagram illustrating an election process of a block generation committee from among validators according to an embodiment of the present disclosure.

FIG. 5 is a diagram illustrating an election process for a block generation committee from among validators according to an embodiment of the present disclosure.

Referring to FIG. 5, committee nodes of the block generation committee may be reelected for each preset cycle (e.g., 1 block, 10 blocks). If blocks up to block N are currently treated and the block generation cycle is 1 block, reelection may be performed based on the state of the blockchain system to which block treatments up to block N are reflected.

The Validator Registry may store the validator information including the value of a Public Key 501, an Index 502, a Balance 503, or the value of a Reward 504.

The blockchain committee election apparatus may generate 505 a draw pool 506 based on the validator information stored in the Validator Registry.

Information about the draw pool may be composed of entries having values of a draw Index 507 and a Public key 508.

The draw pool is generated by reflecting the number of votes of the validator and may have three entries if the validator has 3 votes.

The number of votes of the validator may be computed by Floor (balance/Staking_Unit of the validator).

The blockchain committee election apparatus may generate the draw pool by reading the values of the Public key and Balance from the entries of the Validator Registry, the entries being identified by the Index 502, and by adding draw pool entries to the draw pool in proportion to the number of votes of the validator.

Here, the blockchain committee election apparatus may sequentially access and treat the Validator Registry Entry from Index 0 to Index N−1.

For example, when a value of Staking_Unit is 50, an embodiment of the draw pool may be equal to that of reference numeral 506, where T is the total number of votes of the validator.

A shuffling algorithm 509 may randomly change the value of a Public key 508 corresponding to the draw Index 507 of the draw pool.

The aforementioned information about the draw pool may be stored in a variable of votePool. An index of votePool is a value of the draw Index. A seed indicates a seed value stored in the current state of the blockchain. A random number is generated one by one from a random number generator. The random number generator may be initialized and operated with the seed value.

It may be noted that the following pseudo code 1 indicates the shuffling algorithm according to an embodiment of the present disclosure.

[Pseudo code 1]

```
votePool[0 . . . T−1]//draw pool, store Public key information
Shuffle(votePool, seed, T)
Shuffle(set votePool, seed int, size int) {
    for (i=0;i<size; i++) {
        rndGen=NewRandomGenerator(seed)
        newIndex=rndGen.getNextRandom(T)//returns 0 . . . T−1 integer
        swap(set[i], set[newIndex])//index exchange of draw pool
    }
}
```

The draw pool changed by the shuffling algorithm may be shown as reference numeral 510.

The blockchain committed election apparatus may select, as votes of the committee, preset top Committee_Size entries from among the entries of the shuffled draw pool, as indicated by reference numeral 511.

Here, the blockchain committee election apparatus may elect, as a committee node, a validator who acquires one or more votes of the committee.

A validator who acquires X votes may cast X votes as votes of the committee member in a process for generating blocks by means of a BFT consensus protocol.

Here, the committee node is allowed to cast several votes, and thus it may be effective in reducing the number of committee nodes.

Figure 6:
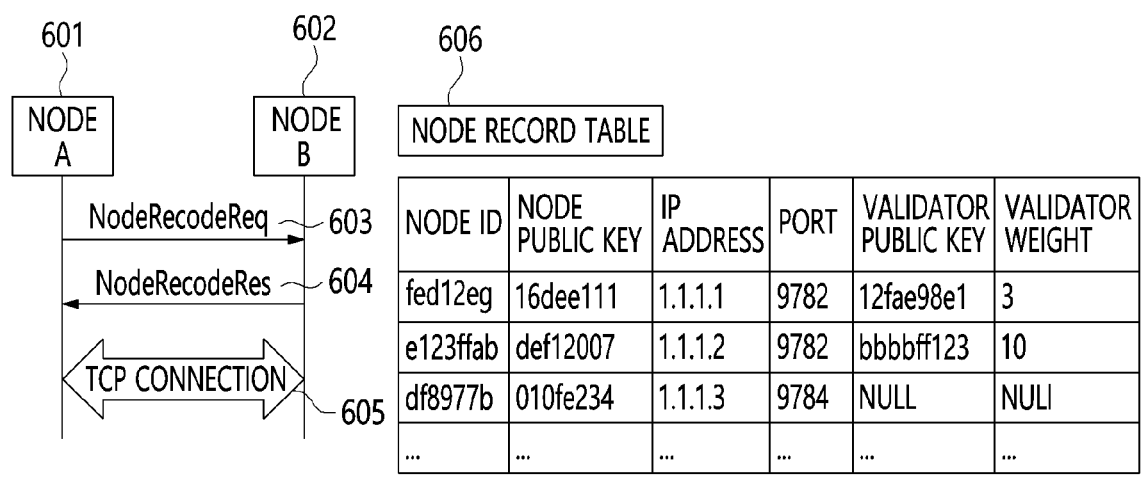
FIG. 6 is a diagram illustrating an inter-node connection process according to an embodiment of the present disclosure.

FIG. 6 is a diagram illustrating an inter-node connection process an embodiment of the present disclosure.

Referring to FIG. 6, each node 601, 602 may manage connection information with peers using a Node Record Table 606 by transmitting and receiving protocol messages through a TCP connection 605.

When node A 601 finds new node B 602, node A may transmit 603 a NodeRecordReq message to node B.

Here, node B may add its own node information to a NodeRecordRes message to transmit 604 the message to node A.

The NodeRecordRes message may include a Node Record of node B.

Here, the Node Record may include information about Node B including a Node id, a Node public key, an IP address, a Port, a Validator public key, or a Validator weight.

When node B is not a validator node, values of the Validator public key and Validator weight may be null.

When node B is a validator node, an electronic signature for (Node id, Validator public key) made with a secret key of the validator may be included.

When node A succeeds verification of the electronic signature and a weight value is not wrong in comparison to the value in the Validator Registry stored in the current blockchain, the Node Record added to the NodeRecordRes message may be reflected to the Node Record Table 606.

The Node Record Table 606 may store information including a Node id, a Node public key, an IP address, a Port, a Validator public key, or a Validator weight.

The Node id is an identifier by which a node is uniquely identified.

The Node public key is a public key of a node and may be used for authenticating a message transmitted by the node.

The IP address and Port may be used for setting the TCP connection 605 for transmitting and receiving, with the node, a protocol message related to the operation of the blockchain.

The Validator public key may store the public key of the validator when the node is a validator node.

The Validator weight is a weight of the validator and is the number of votes of the validator identified with the Validator Public key in the Validator Registry in a blockchain state.

Figure 7:
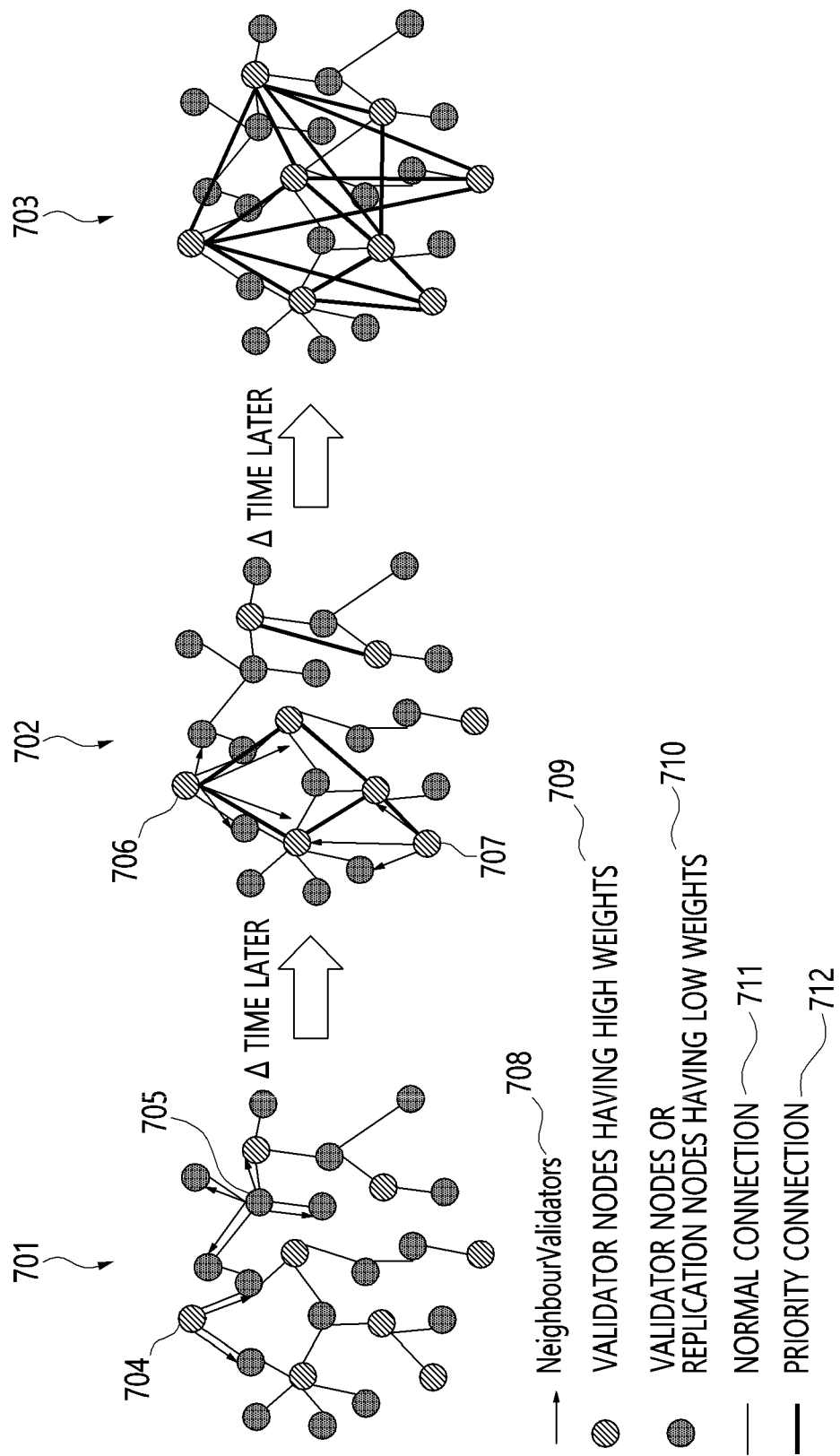
FIG. 7 is a diagram illustrating a p2p network configuration in which a validator node having a heavy weight is preferred according to an embodiment of the present disclosure.

FIG. 7 is a diagram illustrating a p2p network configuration in which a validator node having a heavy weight is preferred according to an embodiment of the present disclosure.

Referring to FIG. 7, as shown in FIG. 6, a P2P network may be configured by being connected with peers that are randomly selected by each of the nodes.

Each of the nodes may have the same number of normal connections as a value of MAX_NORMAL_CONNECTION (e.g., 30) and the same number of priority connections as a value of MAX_VALIDATOR_CONNECTION (e.g., 20).

The normal connections are not forcibly terminated unless the node does not exhibit abnormal behavior. However, in the priority connections, a previous connection may be forcibly terminated for a new connection with the validator node having a heavier weight.

The validator node having a heavy weight means a node operated by a validator having many votes.

Here, as the heavier the weight, a higher probability to be a committee node the validator node has.

Accordingly, when validator nodes with heavier weights are connected by less network hops, the average number of network hops may be made smaller even when the committee nodes are randomly selected from among the validator nodes.

It may be noted that a P2P network 701 indicates a p2p network when there is not a priority connection 712.

It is also noted that the P2P network 701 is a network in which all nodes are randomly connected through normal connections 711 regardless of the roles of the nodes.

Here, the average number of network hops between the validator nodes 709 having heavy weights may be almost the same as that of all the nodes 709, 710.

For example, when the average number of network hops of all the nodes is assumed to be 3.5 hops, the average number of hops between the validator nodes having heavy weights may be similar to 3.5 hops.

Each of the nodes 704, 705 may transmit a NeighbourValidators message to its own peers for each specific cycle (e.g., 30 seconds).

The NeighbourValidators message may include information about t validator nodes having heavy weights among nodes having a peer relationship with nodes that transmit the message.

The information about t validator nodes may be extracted from the Node Record Table.

The information about a validator node may include a node id, a public key, and a weight of the validator.

A node receiving the NeighbourValidators message may update a ValidatorNode table.

The ValidatorNode table is a table in which entries composed of a node id, a public key, and a weight of the validator are stored.

The validator node may perform connections with a node having a heavy weight through the aforementioned inter-node connection method using the information about a validator node acquired from the ValidatorNode table.

It may be noted that the P2P network 702 indicates a P2P network after time Δ has passed in P2P network 701.

It may be noted that, in the P2P network 702, priority connections are generated between the validator nodes.

Here, after a certain time has passed again, the nodes 706, 707 may be connected to the validator node having heavy weights through exchange of NeighbourValidator messages.

Here, after time Δ has passed again, as shown in a P2P network 703, the priority connections increase between the validator nodes having heavy weights.

Through this, the average number of network hops of the validator nodes having heavy weights may be reduced.

Figure 8:
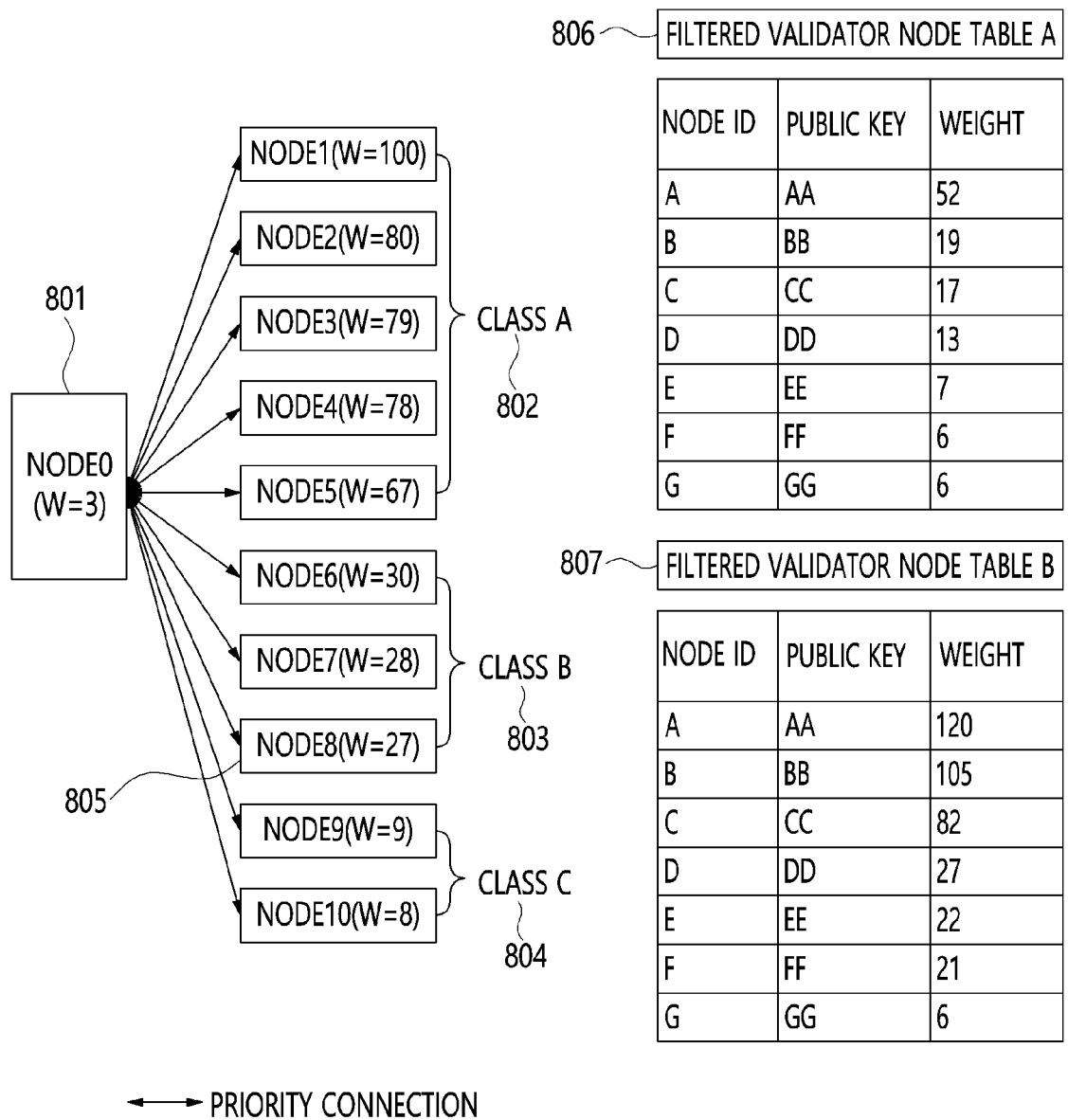
FIG. 8 is a diagram illustrating a connection process of a priority connection according to an embodiment of the present disclosure.

FIG. 8 is a diagram illustrating a connection configuration of the priority connections according to an embodiment of the present disclosure.

Referring to FIG. 8, it may be noted that node 0 801 has 10 priority connections. Namely, the value of MAX_VALIDATOR_CONNECTION is 10.

Here, for node 0 801, as a condition for the priority connections, a minimum weight value of a node may be allocated as a system parameter. Namely, it may be noted that the minimum weight value is allocated to 3.

Node 0 801 may have a ValidatorNode table through the aforementioned method in FIG. 7.

Here, tables arranged according to weight values of nodes other than the connected nodes are referred to as Filtered Validator Node Tables 806, 807.

The priority connections may be managed for each of priority connection classes 802, 803, 804. The priority connection classes may be determined with weight values of peer nodes.

For example, for class A 802, the category of weight values of peer nodes has a start value of 51 and a termination value of 1000. For class B 803, a start value is 21, and a termination value is 50. For class C 804, a start value is 3, and a termination value is 19. For each of the classes, the number of connections may be defined in advance. According to an embodiment, the number of connections of class A is 5, the number of connections of class B is 3, and the number of connections of class C is 2.

Node 0 801 may set the priority connections using Filtered Validator Node Tables 807, 808.

Here, when the number of class connections is insufficient, node 0 801 may perform a connection with a node selected, through random selection, from among nodes corresponding to the corresponding class of the Filtered Validator Node Tables 807, 808.

For example, when there is not a connection with node 8 805 and the Filtered Validator Node Table of node 0 801 is equal to table B 807, node 0 801 may be connected to a node randomly selected from among node D, E, or F.

When there is not a node corresponding to the corresponding class, node 0 801 may attempt to establish a connection to a node that has a smallest difference between a start value and a termination value as boundary values of connections of the corresponding class.

For example, when the Filtered Validator Node Table is equal to Table A 806, node 0 801 may select node B as a connection node.

Even in a state where the connections are already completed by the number of priority connections, node 0 801 may terminate the connections with the connected nodes and attempt to establish a connection to a new node with reference to the Filtered Validator Node Table for each specific cycle (e.g., 60 seconds) when the node 0 801 satisfies specific conditions.

A first specific condition is a case where a connection with a node of another class is present. Here, when there is a node corresponding to the corresponding class in the Filtered Validator Node Table, node 0 801 terminates the connection with the node of the unsuitable class and establishes a connection to a new node.

A second specific condition is a case where the average of all the weights of class connections is significantly smaller (e.g., 0.7 times) than the average of weights of the same number of top nodes in the Filtered Validator Node Table. Here, node 0 801 may terminate the connection of the smallest weight among the established connections, and attempt to establish a new connection by randomly selecting a node from among nodes having the weights larger than the average weight of the established connections.

Figure 9:
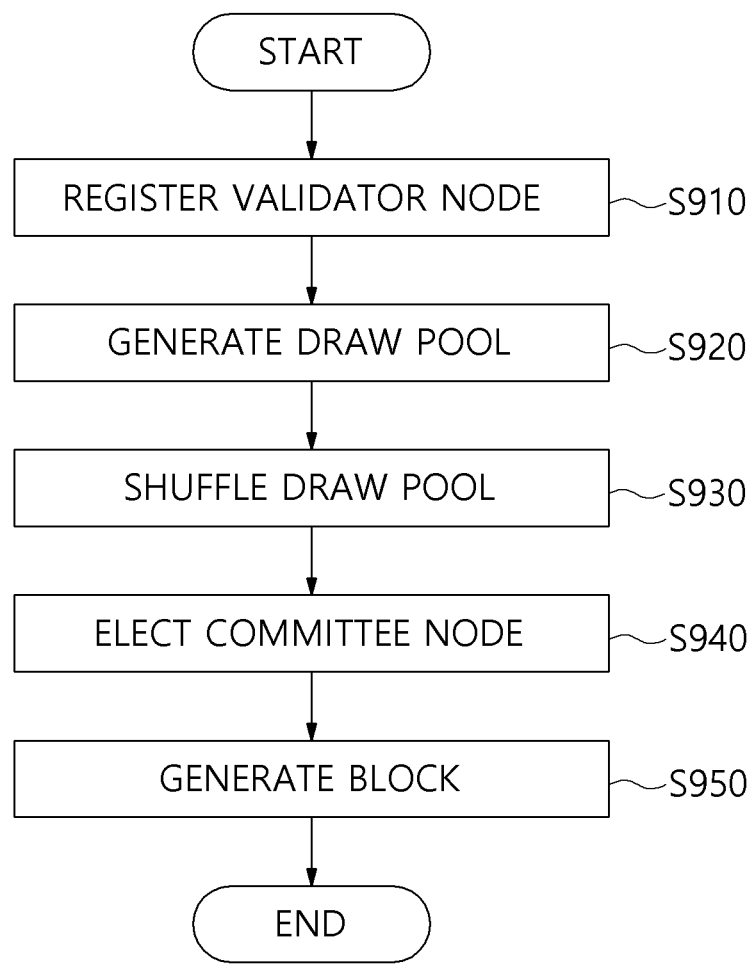
FIG. 9 is an operation flowchart illustrating a method for electing committee nodes in a blockchain according to an embodiment of the present disclosure.

FIG. 9 is an operation flowchart illustrating a method for electing a committee node in a blockchain according to an embodiment of the present disclosure.

Referring to FIG. 9, the method for electing a committee node in a blockchain may register a validator node in step 910.

In other words, in step S910, the validator node may transmit a staking transaction including validator information to a blockchain system to register the validator node.

Here, the staking transaction may include an amount to be staked within an account balance limit of a user who desires to be a validator.

Here, in step S910, the staking transaction may be run to register the corresponding user as a node of a validator who has a balance of the staked amount.

Here, in step S910, the validator keys may be generated which is composed of a private key and a public key.

Here, in step S910, a staking transaction called as RegisterValidator may be made to be transmitted to the blockchain system.

The RegisterValidator transaction may include a public key value between the pair of keys of the validator, an address value of a user account, an amount to be staked, and a nonce value of the transaction.

The transaction may be electronically signed using the private key of the pair of Account keys of the user.

If valid, the RegisterValidator transaction may be included in a block in the blockchain system to be run.

Here, a condition that the transaction is valid may be defined as that an account balance is larger than the preset staking amount, the staking amount is at least Staking_Unit, and the electronic signature is correct.

Here, in step S910, when the Staking transaction is included in the block to be normally run in the blockchain system, the validator information is recorded in a blockchain state, and the user may be registered as the validator node.

Here, the blockchain state may be changed so that the account balance of the user is reduced by the staked amount, and a corresponding Validator is added to the Validator Registry.

Here, as the value of the Public key and the Balance in the Validator Registry, the public key value and the amount to be staked included in the RegisterValidator transaction may be stored. 0 may be stored in the Reward. A smallest value among values of Index, which are not used currently, may be allocated to the Index value. When there is not the value, the current value +1 of the Index may be used.

In addition, the method for electing a committee node in a blockchain may generate a draw pool in step S920.

In other words, in step S920, the draw pool may be generated for electing a committee node based on the validator information.

Here, the committee node may be reelected for each preset cycle (e.g., 1 block, 10 blocks).

If blocks are currently treated up to block N and the block generation cycle is 1 block in step S920, the committee node may be reelected based on a state of the blockchain system to which block treatments up to block N are reflected.

Here, in step S920, the draw pool may be generated based on the validator information stored in the Validator Registry.

The Validator Registry may store information about the validator including the value of the Public Key, the Index, the Balance, or the value of the Reward of the validator.

The draw pool may be configured with entries having the draw Index 507 and the value of the Public key 508.

The draw pool may be generated by reflecting the number of votes of the validator and have three entries if the validator has three votes.

The number of votes of the validator may be computed by Floor (balance/Staking_Unit of the validator).

Here, in step 920, the draw pool may be generated by reading the values of the Public key and Balance from the entries of the validator information in the Validator Registry, the entries being identified by the Index, and by adding draw pool entries to the draw pool in proportion to the number of votes of the validator.

Here, in step S920, the Validator Registry Entry may be sequentially accessed and treated from Index 0 to up to Index N−1.

In addition, the method for electing a committee node in a blockchain according to an embodiment of the present disclosure may shuffle the draw pool in step S930.

In other words, in step S930, the draw entries of the draw pool may be randomly changed using a predefined shuffling algorithm.

Here, the shuffling algorithm may randomly change the value of the Public key corresponding to the draw Index 507 of the draw pool.

Here, in step S930, the preset top Committee_Size entries among the entries of the shuffled draw pool may be selected as the votes of the committee.

In addition, the method for electing a committee node in a blockchain according to an embodiment of the present disclosure may elect the committee node in step S940.

In other words, in step S940, the validator node which acquires one or more votes of the committee may be elected as a committee node.

In addition, the method for electing a committee node in a blockchain may generate blocks in step 950.

In other words, in step S950, the validator node which acquires X votes may cast X votes as a vote of the committee in a process for generating blocks by means of a BFT consensus protocol.

Here, the committee node is allowed to cast several votes, and thus it may be effective in reducing the number of committee nodes.

Figure 10:
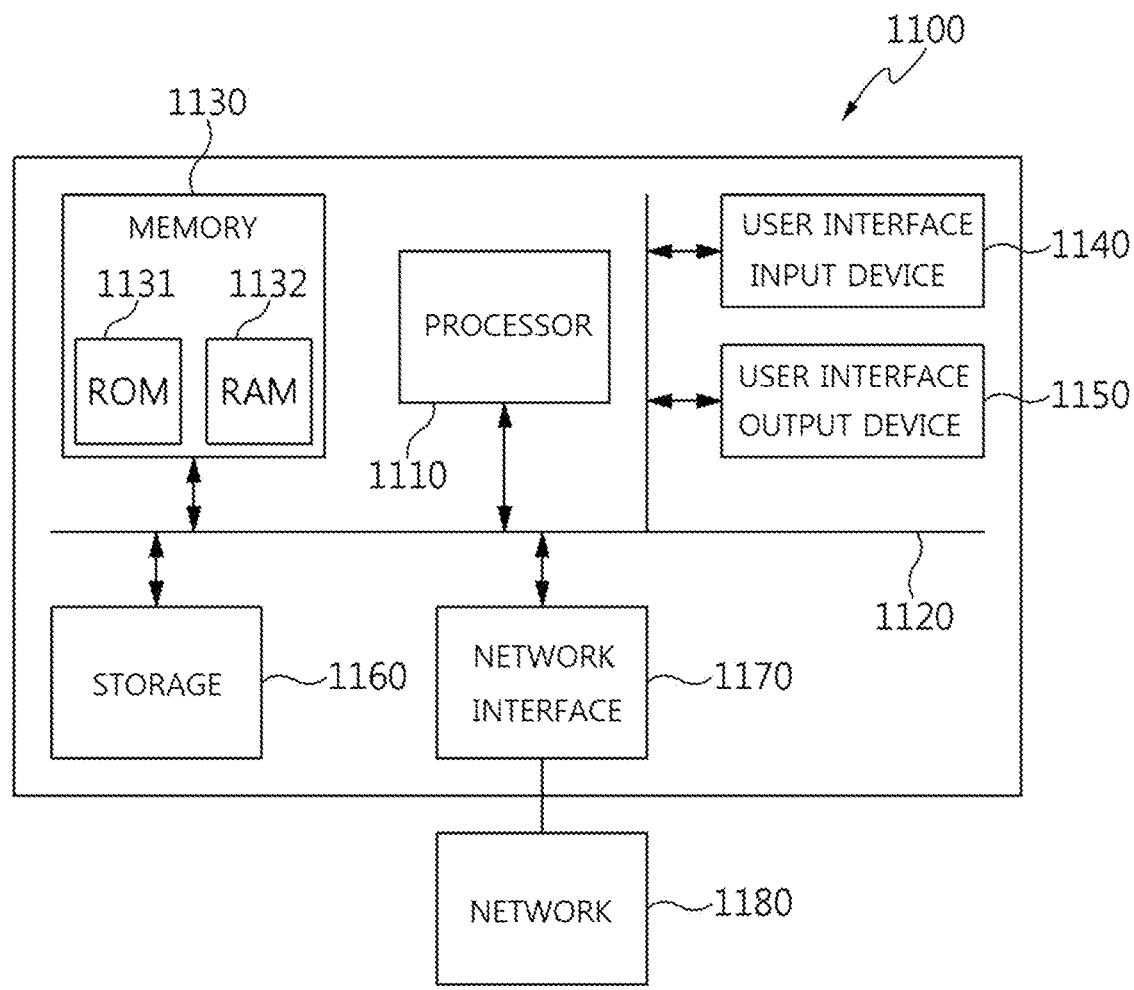
FIG. 10 is a diagram illustrating a computer system according to an embodiment of the present disclosure.

FIG. 10 is a computer system according to an embodiment of the present disclosure.

Referring to FIG. 10, all the nodes of a blockchain system, and an apparatus for electing a committee node in a blockchain according to the embodiment of the present disclosure may be implemented in a computer system 1100 such as a computer-readable storage medium. As shown in FIG. 10, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132

The apparatus for electing a committee node in a blockchain according to an embodiment of the present disclosure includes one or more processors 1110 and memory 1130 configured to store at least one program that is executed by the one or more processors 1110, wherein the at least one program is configured to transmit a staking transaction including validator information to a blockchain system to register a validator node, generate a draw pool for electing a committee node based on the validator information, change entries of the draw pool using a predefined shuffling algorithm, select a preset number of top entries as votes of a committee member from among the entries of the shuffled draw pool, and elect, as the committee node, the validator node that has acquired votes of a committee.

Here, the at least one program may be configured to generate the draw pool by reading a validator public key and balance from the validator information, and by adding draw pool entries to the draw pool in proportion to the number of votes of the validator.

Her, the draw pool may include entries having the validator public key corresponding to a draw index.

Here, the at least one program may be configured to randomly change the validator public key corresponding to the draw index among the entries of the draw pool to a validator public key of an additional draw pool using the predefined shuffling algorithm.

Here, the committee node may cast a number of votes identical to the number of votes of a committee member in order to generate blocks in a block generation process.

Here, each validator node may have a weight proportional to voting power thereof (the number of votes) and a validator node which has heavier weight than a preset weight may become a prioritized validator, wherein the prioritized validator may establish priority connection with other prioritized validators.

Here, the prioritized validator node may forcibly terminate normal connection with a previously connected node which is not a prioritized validator node in order to perform the priority connection.

Here, the priority connection may be managed as a priority connection class by nodes of the blockchain system.

Here, the nodes of the blockchain system may establish the priority connection with other nodes based on the current number of established connections corresponding to each priority connection class.

Accordingly, the present disclosure may reduce a consensus delay time of the block generation committee.

In addition, the present disclosure may reduce a network delay between nodes that participate in a consensus protocol.

As described above, in the apparatus and method for electing a committee node in a blockchain according to the present disclosure, the configurations and schemes in the above-described embodiments are not limitedly applied, and some or all of the above embodiments can be selectively combined and configured so that various modifications are possible

What is claimed is:

1. An apparatus for electing a committee node in a blockchain, comprising:
    one or more processors; and
    a memory configured to store at least one program that is executed by the one or more processors,
    wherein the at least one program is configured to:
    transmit a staking transaction including validator information to a blockchain system to register a validator node,
    generate a draw pool for electing a committee node based on the validator information,
    change entries of the draw pool using a predefined shuffling algorithm,
    select a preset number of top entries as votes of a committee member from among the entries of the shuffled draw pool, and
    elect, as the committee node, the validator node that has acquired votes of a committee.

2. The apparatus of claim 1, wherein the at least one program is configured to generate the draw pool by reading a validator public key and balance from the validator information, and by adding draw pool entries to the draw pool in proportion to a number of votes of the validator.

3. The apparatus of claim 2, wherein the draw pool comprises entries having the validator public key corresponding to a draw index.

4. The apparatus of claim 3, wherein the at least one program is configured to randomly change the validator public key corresponding to the draw index among the entries of the draw pool to a validator public key of an additional draw pool using the predefined shuffling algorithm.

5. The apparatus of claim 4, wherein the committee node casts a number of votes identical to a number of votes of a committee member in order to generate blocks in a block generation process.

6. The apparatus of claim 2, wherein:
    each validator node has a weight proportional to voting power thereof and a validator node which has heavier weight than a preset weight becomes a prioritized validator, and
    the prioritized validator establishes priority connection with other prioritized validators.

7. The apparatus of claim 6, wherein the prioritized validator node forcibly terminates normal connection with a previously connected node which is not a prioritized validator node in order to perform the priority connection.

8. The apparatus of claim 7, wherein the priority connection is managed as a priority connection class by nodes of the blockchain system.

9. The apparatus of claim 8, wherein the nodes of the blockchain system establishes the priority connection with other nodes based on a current number of established connections corresponding to each priority connection class.

10. A method for electing a committee node in a blockchain, the method being performed by an apparatus for electing a committee node in a blockchain, the method comprising:
- transmitting a staking transaction including validator information to a blockchain system to register a validator node;
- generating a draw pool for electing a committee node based on the validator information;
- changing entries of the draw pool using a predefined shuffling algorithm;
- selecting a preset number of top entries as votes of a committee member from among the entries of the shuffled draw pool; and
- electing, as the committee node, the validator node that has acquired votes of a committee.

11. The method of claim 10, wherein generating the draw pool comprises:
- generating the draw pool by reading a validator public key and balance from the validator information, and by adding draw pool entries to the draw pool in proportion to a number of votes of the validator.

12. The method of claim 11, wherein the draw pool comprises entries having the validator public key corresponding to a draw index.

13. The method of claim 12, wherein changing the entries of the draw pool comprises:
- randomly changing the validator public key corresponding to the draw index among the entries of the draw pool to a validator public key of an additional draw pool using the predefined shuffling algorithm.

14. The method of claim 13, wherein the committee node casts a number of votes identical to a number of votes of a committee member in order to generate blocks in a block generation process.

15. The method of claim 11, wherein:
- each validator node has a weight proportional to voting power thereof and a validator node which has heavier weight than a preset weight becomes a prioritized validator, and
- the prioritized validator establishes priority connection with other prioritized validators.

16. The method of claim 15, wherein the prioritized validator node forcibly terminates normal connection with a previously connected node which is not a prioritized validator node in order to perform the priority connection.

17. The method of claim 16, wherein the priority connection is managed as a priority connection class by nodes of the blockchain system.

18. The method of claim 17, wherein the nodes of the blockchain system establishes the priority connection with other nodes based on a current number of established connections corresponding to each priority connection class.

* * * * *